US012589648B2

(12) United States Patent
Schilder et al.

(10) Patent No.: US 12,589,648 B2
(45) Date of Patent: Mar. 31, 2026

(54) DRIVE DEVICE FOR A MOTOR VEHICLE, IN PARTICULAR FOR A CAR

(71) Applicant: MERCEDES-BENZ GROUP AG, Stuttgart (DE)

(72) Inventors: Tobias Schilder, Ludwigsburg (DE); Tobias Haerter, Stuttgart (DE); Goran Ogrizovic, Nuertingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/852,672

(22) PCT Filed: Mar. 24, 2023

(86) PCT No.: PCT/EP2023/057693
§ 371 (c)(1),
(2) Date: Sep. 30, 2024

(87) PCT Pub. No.: WO2023/186744
PCT Pub. Date: Oct. 5, 2023

(65) Prior Publication Data
US 2025/0249740 A1 Aug. 7, 2025

(30) Foreign Application Priority Data
Apr. 1, 2022 (DE) ..................... 10 2022 001 133.6

(51) Int. Cl.
*B60K 1/00* (2006.01)
*B60K 17/04* (2006.01)
(Continued)

(52) U.S. Cl.
CPC .............. *B60K 17/165* (2013.01); *B60K 1/00* (2013.01); *F16H 48/08* (2013.01); *F16H 48/11* (2013.01);
(Continued)

(58) Field of Classification Search
CPC .. B60K 17/165; B60K 1/00; B60K 2001/001; B60K 7/00–2007/0092; F16H 48/08;
(Continued)

(56) References Cited

U.S. PATENT DOCUMENTS

2013/0147291 A1 6/2013 Woolmer et al.
2023/0307991 A1* 9/2023 Reimnitz ............... H02K 7/116

FOREIGN PATENT DOCUMENTS

CN 209552931 U * 10/2019 ............. B60K 17/04
CN 215817745 U 2/2022
(Continued)

OTHER PUBLICATIONS

International Search Report and Written Opinion mailed Jul. 7, 2023 in related/corresponding International Application No. PCT/EP2023/057693.
(Continued)

*Primary Examiner* — Tinh T Dang
(74) *Attorney, Agent, or Firm* — PATENT PORTFOLIO

(57) ABSTRACT

A drive device for a motor vehicle has an electric engine formed as an axial flow engine, which has a stator and two rotors that can be rotated in relation to the stator. The stator is arranged between the rotors in the axial direction of the axial flow engine. A differential transmission is arranged at least partially radially inside the stator, the differential transmission having a first driven gear non-rotationally connected to a first driven shaft and a second driven gear non-rotationally connected to a second driven shaft. The rotors each have a rotor support, which are connected to one another in a form-fit manner and form a differential housing when seen at least in the axial direction of the electric engine.

12 Claims, 8 Drawing Sheets

Figure 1:
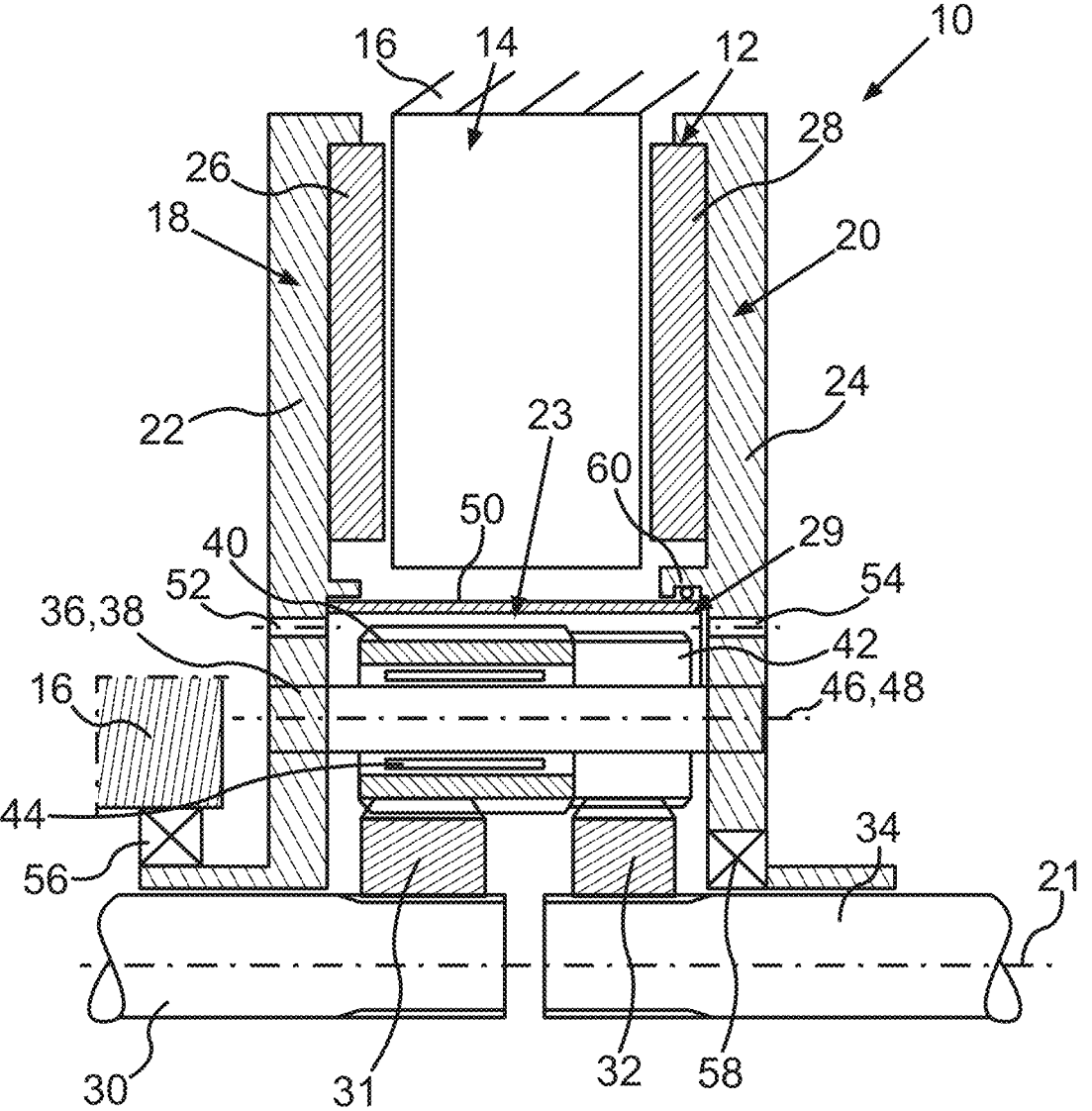

(51) Int. Cl.
 B60K 17/16 (2006.01)
 F16H 48/08 (2006.01)
 F16H 48/10 (2012.01)
 F16H 48/11 (2012.01)
 H02K 7/116 (2006.01)
 H02K 21/24 (2006.01)
(52) U.S. Cl.
 CPC ............. H02K 7/116 (2013.01); H02K 21/24
 (2013.01); B60K 2001/001 (2013.01); F16H
 2048/106 (2013.01)
(58) Field of Classification Search
 CPC ............... F16H 48/11; F16H 2048/106; F16H
 48/05–48/38; H02K 37/06; H02K
 37/00–37/08; H02K 23/04; H02K 1/2798;
 B60Y 2400/607; B60Y 2410/10; B60Y
 2410/102
 See application file for complete search history.

(56) References Cited

FOREIGN PATENT DOCUMENTS

| DE | 19860618 | C1 | 5/2000 |
| DE | 102009012256 | A1 | 9/2010 |
| DE | 102010048837 | A1 | 4/2012 |
| DE | 102018203355 | A1 | 10/2018 |
| DE | 102020109112 | A1 | 10/2021 |
| DE | 102020209431 | A1 | 1/2022 |

OTHER PUBLICATIONS

Office Action created Jan. 27, 2023 in related/corresponding DE Application No. 10 2022 001 133.6.

* cited by examiner

DRIVE DEVICE FOR A MOTOR VEHICLE, IN PARTICULAR FOR A CAR

BACKGROUND AND SUMMARY OF THE INVENTION

Exemplary embodiments of the invention relate to a drive device for a motor vehicle, in particular for a car.

Such drive devices for motor vehicles, in particular for cars, are already adequately known from the general prior art. The drive device has an electric engine, which is formed as an axial flow engine. The axial flow engine is also referred to as a disc engine and has a stator and two rotors that can be rotated in relation to the stator, wherein the stator is arranged between the rotors in the axial direction of the axial flow engine.

Furthermore, DE 10 2009 012 256 A1 discloses a drive device for a vehicle operated by an electric engine, comprising an electric engine having a rotor and a stator. A differential transmission is also provided.

Exemplary embodiments of the present invention are directed to a drive device of the kind mentioned at the start, such that a particularly advantageous drive can be implemented in a manner particularly favorable in terms of construction space and weight.

In order to further develop a drive device in such a way that a particularly advantageous drive of the motor vehicle can be implemented in a manner that is particularly favorable in terms of construction space and weight, according to the invention a differential transmission is provided, which has a first driven gear connected to a first driven shaft in a rotationally fixed manner and a second driven gear connected to a second driven shaft in a rotationally fixed manner. The rotors each have a rotor support that are connected to one another in a form-fit manner. Thus, the rotors are connected to one another in a form-fit manner and, in particular, in a rotationally fixed manner. When seen at least in the axial direction of the electric engine, the rotors form a differential housing, also referred to as a differential transmission housing, in which the differential transmission, for example, is at least partially arranged, in particular in such a way that the differential transmission is covered outwardly in the radial direction of the electric engine at least partially by the differential housing.

In an advantageous design of the invention, the differential transmission, also simply referred to as the differential, is formed as a planetary differential. The planetary differential is also referred to as a planetary differential transmission or spur gear transmission and is arranged at least partially radially inside the stator. This means that the differential transmission, in particular the planetary differential, is arranged at least partially inside the stator in the radial direction of the axial flow machine. This also means that at least one longitudinal region of the differential transmission running in the axial direction of the axial flow direction, in particular the planetary differential, which is also referred to as a planetary gear differential or planetary gear differential transmission, overlaps or is covered outwardly in the radial direction of the axial flow engine by the stator, in particular completely peripherally in the peripheral direction running around the axial direction of the axial flow engine. The axial direction of the axial flow engine coincides with an axis of rotation, wherein the rotors can be driven by means of the stator and can thus be rotated around said axis of rotation in relation to the stator. The radial direction of the axial flow engine runs perpendicularly to the axial direction and thus perpendicularly to the axis of rotation.

The first driven gear is here a first sun gear connected to the first driven shaft in a rotationally fixed manner, and the second driven gear is here a second sun gear connected to the second driven shaft in a rotationally fixed manner. Furthermore, the planetary differential preferably has at least two planetary bolts held on the rotor supports, via which planetary bolts the rotor supports are connected to one another in a form-fit manner. The planetary differential has at least one first planetary gear rotatably held on a first of the planetary bolts and meshing with the first sun gear. Moreover, the planetary differential has at least one second planetary gear rotatably held on the second planetary bolt and meshing with the second sun gear, which second planetary gear also meshes with the first planetary gear. In particular, the planetary bolts are arranged one after the other in the peripheral direction of the axial flow engine running around the axial direction of the axial flow engine and thus around the axis of rotation. The planetary bolts are held on the rotors such that the rotors are connected to one another in a form-fit manner via the planetary bolts. In particular, the respective planetary bolt is connected in a rotationally fixed manner to the rotors. In particular, the first sun gear is a first spur gear of the planetary differential. Furthermore, the second sun gear, for example, is a second spur gear of the planetary differential.

Moreover, the planetary differential has the first planetary gear rotatably held on the first planetary bolt and meshing with the first sun gear, the first planetary gear is a third spur gear of the planetary differential. The planetary differential has the second planetary gear rotatably held on the second planetary bolt, the second planetary gear being a fourth spur gear of the planetary differential. The second planetary gear meshes with the second sun gear. Moreover, the second planetary gear meshes with the first planetary gear. Thus, the planetary differential is integrated into the axial flow engine in a manner that is particularly favorable in terms of construction space. Moreover, the rotor supports and thus the rotors form the differential housing, wherein the planetary bolts are held on the differential housing, in particular in a rotationally fixed manner. Moreover, the planetary gears are arranged at least partially in the differential housing. Thus, as a result of the invention, at least the following advantages are achieved:

optimum use of construction space due to synergy effects between the axial flow engine and the differential transmission, which is also simply referred to as the differential;

combined assembly of the axial flow engine and the differential and thus reduction of partial tasks;

laborious screw connection and/or plug connection of the rotors to one another or with one another and with a power extraction point can be avoided, since a connection of the rotors to one another that is rotationally fixed, in particular, and/or form-fit can be achieved in such a way that the planetary bolts also referred to as bolts are mounted on the rotors, in particular rotor supports, and thus connected to the rotors, in particular in a rotationally fixed manner; and with the differential arranged next to the axial flow engine, a differential driven shaft is once again forced through the axial flow engine, which causes diameter limitations and can be avoided by the invention.

It is fundamentally conceivable that the differential transmission is formed as a bevel differential, which is also referred to as bevel gear differential or ball differential. Furthermore, it is conceivable that the differential transmission is formed as a crown gear differential, which is also referred to as a crown gear differential transmission. However, by forming the differential transmission as a planetary differential, a particularly low construction space requirement can be achieved, in particular in the radial direction of the axial flow engine and thus the drive device overall.

By joining the parts of the drive device according to the invention, the differential and the axial flow engine are assembled at the same time. Thus, partial assembly scopes no longer apply since a positioning of the rotor supports in relation to one another, for example, and a mounting of the differential are carried out together. Thus, the drive device can be assembled in a manner that is particularly favorable in terms of time and cost. Compared to conventional solutions, laborious screw connections or plug connections can be dispensed with, since a force introduction runs directly from the respective rotor, in particular rotor support, into the differential or differential housing, in particular in such a way that the respective rotor support of the respective rotor, for example, is formed in one piece, in particular integrally, with a respective housing part of the differential housing. In combination with a planetary or spur gear differential, a direct force introduction into the planetary bolts, also referred to planetary gear bolts, is carried out via respective webs. The respective web is to be understood to mean a respective planetary support, which, in the invention, is formed by the respective rotor, in particular rotor support, or by the respective housing part of the differential housing formed by the respective rotor, in particular rotor support. In other words, since the planetary gears are rotatably held on the planetary bolts and since the planetary bolts are held on the rotors, in particular on the rotor supports, the rotors, in particular the rotor supports, simultaneously function as planetary supports on which the planetary gears are rotatably held. Thus, the number of parts and thus the weight, the costs and the construction space requirement of the drive device can be kept particularly low. Furthermore, the invention allows a wide bearing base for bearing the rotor supports, in particular a compound, which comprises the rotor supports and the differential. The invention is suitable for both a coaxial and for an axially parallel construction. A further implementation structure can be avoided. The differential can be designed to be particularly compact as a result of any downstream transmission, in particular on each output side.

In an advantageous design of the invention, the differential transmission is formed as a bevel gear differential, wherein the rotor supports are connected to one another in a form-fit manner via at least one web. For example, the web is formed separately from the rotor supports and is connected to the rotor supports, in particular non-rotationally in each case. Here, the first driven gear is a first bevel gear connected non-rotationally to the first driven shaft, and the second driven gear is a second bevel gear connected non-rotationally to the second driven shaft. Here, the bevel gear differential has at least one compensation gear rotatably held on the web, the compensation gear being formed as a third bevel gear of the bevel gear differential meshing simultaneously with the first driven gear and with the second driven gear.

In a further design of the invention, at least one of the rotors is mounted rotatably on a housing of the drive device via at least one bearing, in particular roller bearing, wherein the rotors can be rotated around the axis of rotation in relation to the housing.

In a further design of the invention, at least one of the rotors is mounted rotatably on one of the driven shafts via at least one bearing, in particular the roller bearing.

Further advantages, feature and details of the invention emerge from the description below of preferred exemplary embodiments and by means of the drawings. The features and feature combinations mentioned above in the description and the features and feature combinations mentioned below in the description of the figures and/or shown only in the figures can be used not only in the respectively specified combination, but also in other combinations or on their own without leaving the scope of the invention.

BRIEF DESCRIPTION OF THE DRAWING FIGURES

The drawings show in

Figure 2:
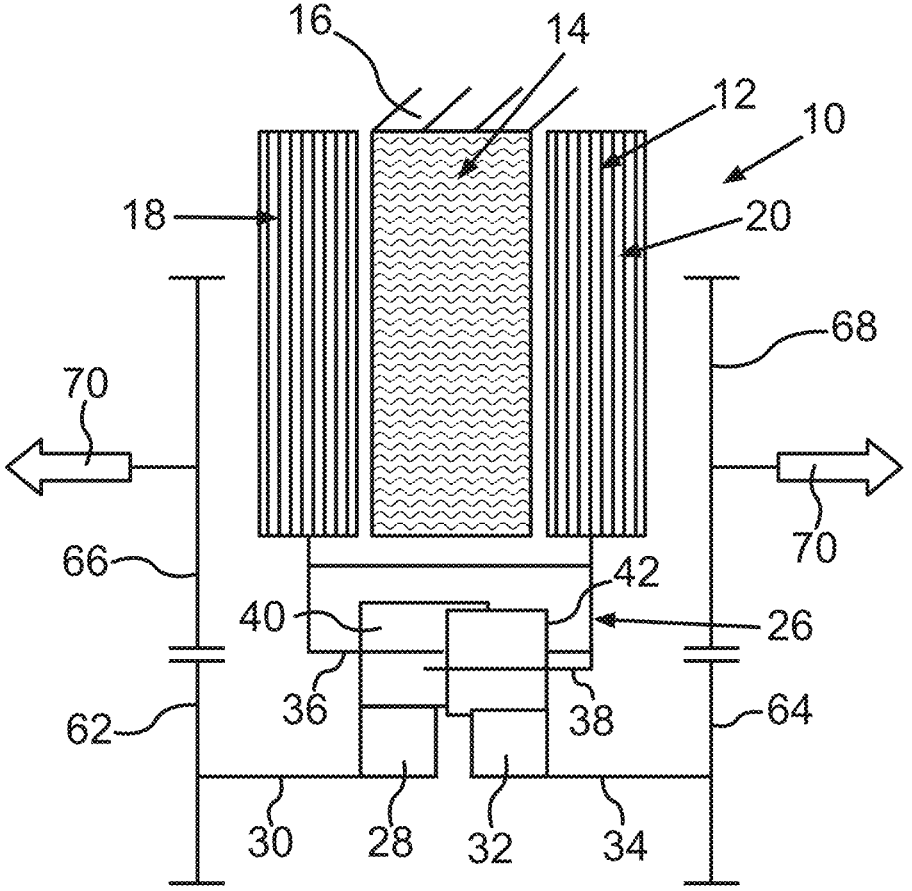
Figure 3:
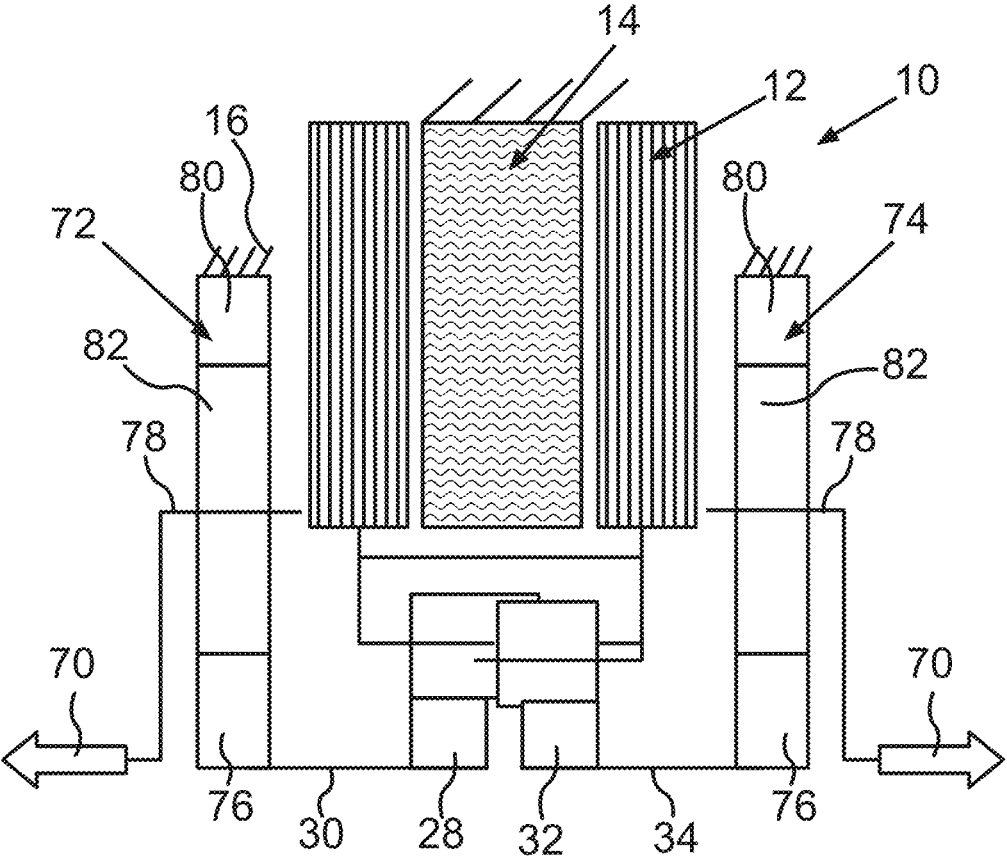
Figure 4:
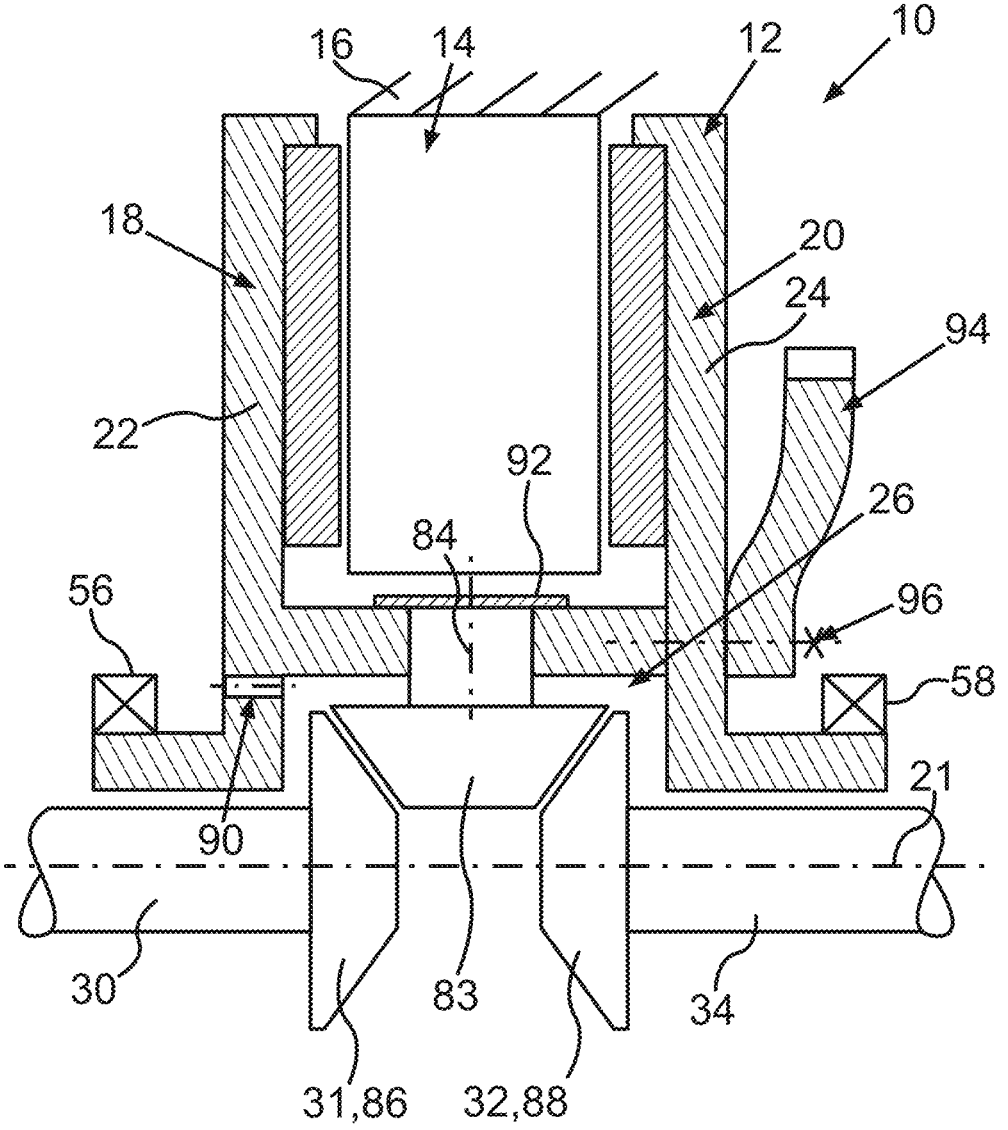
Figure 5:
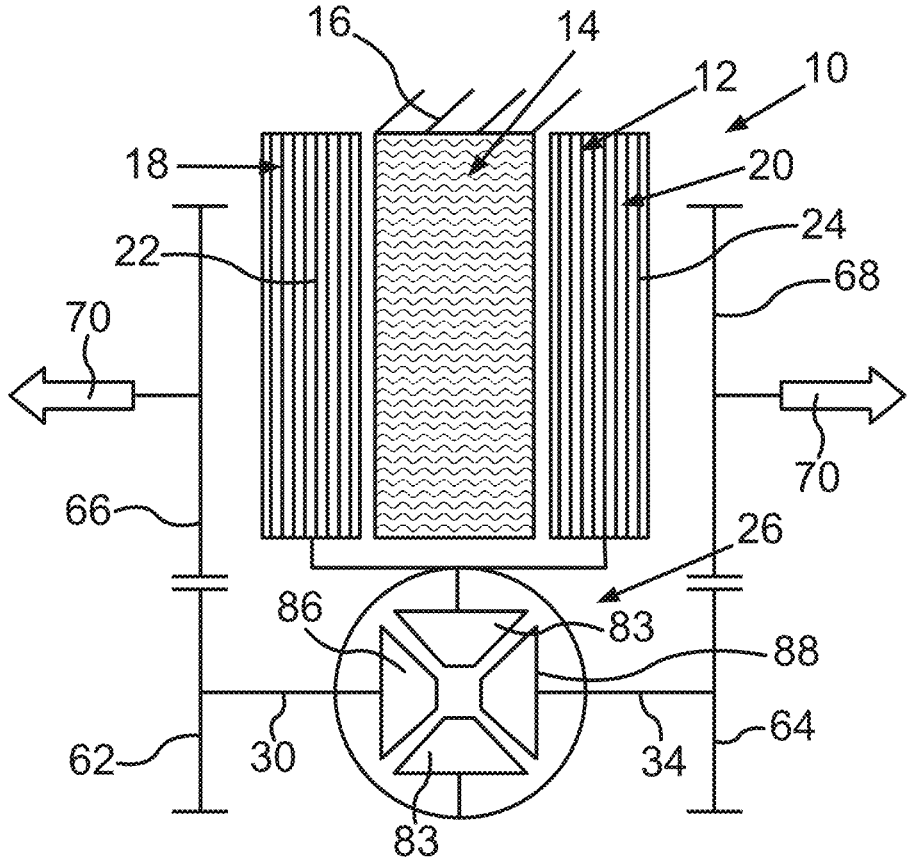
Figure 6:
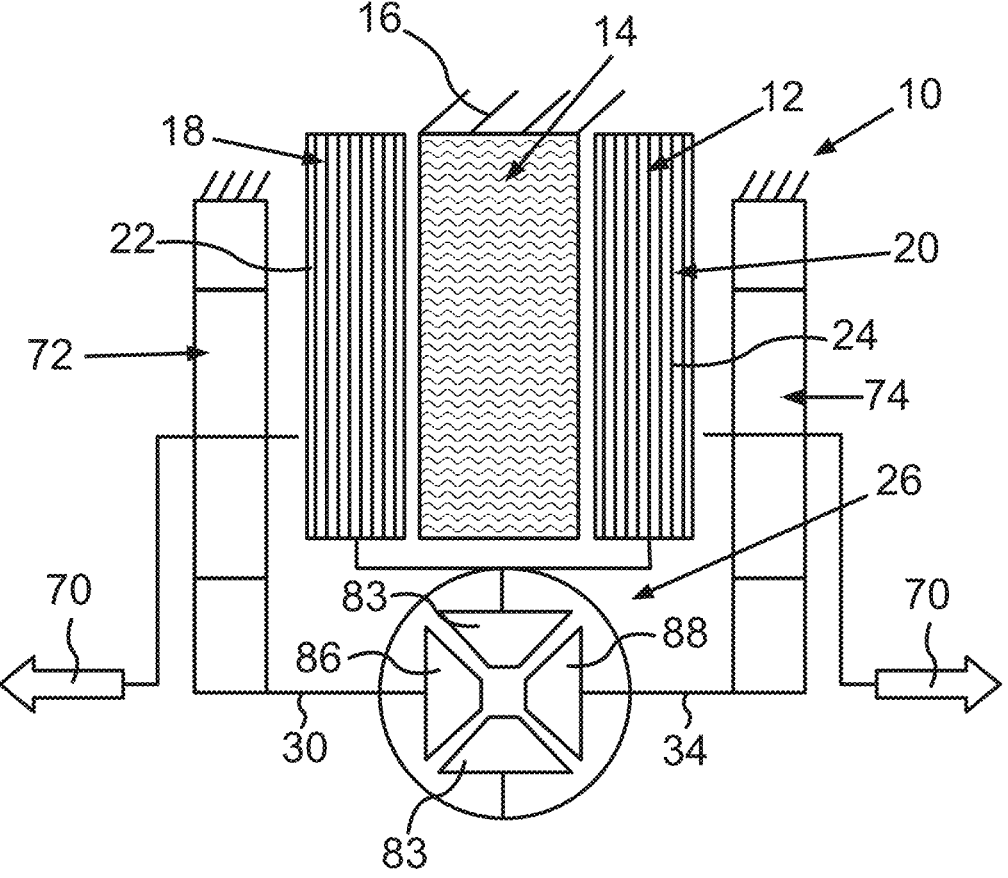
Figure 7:
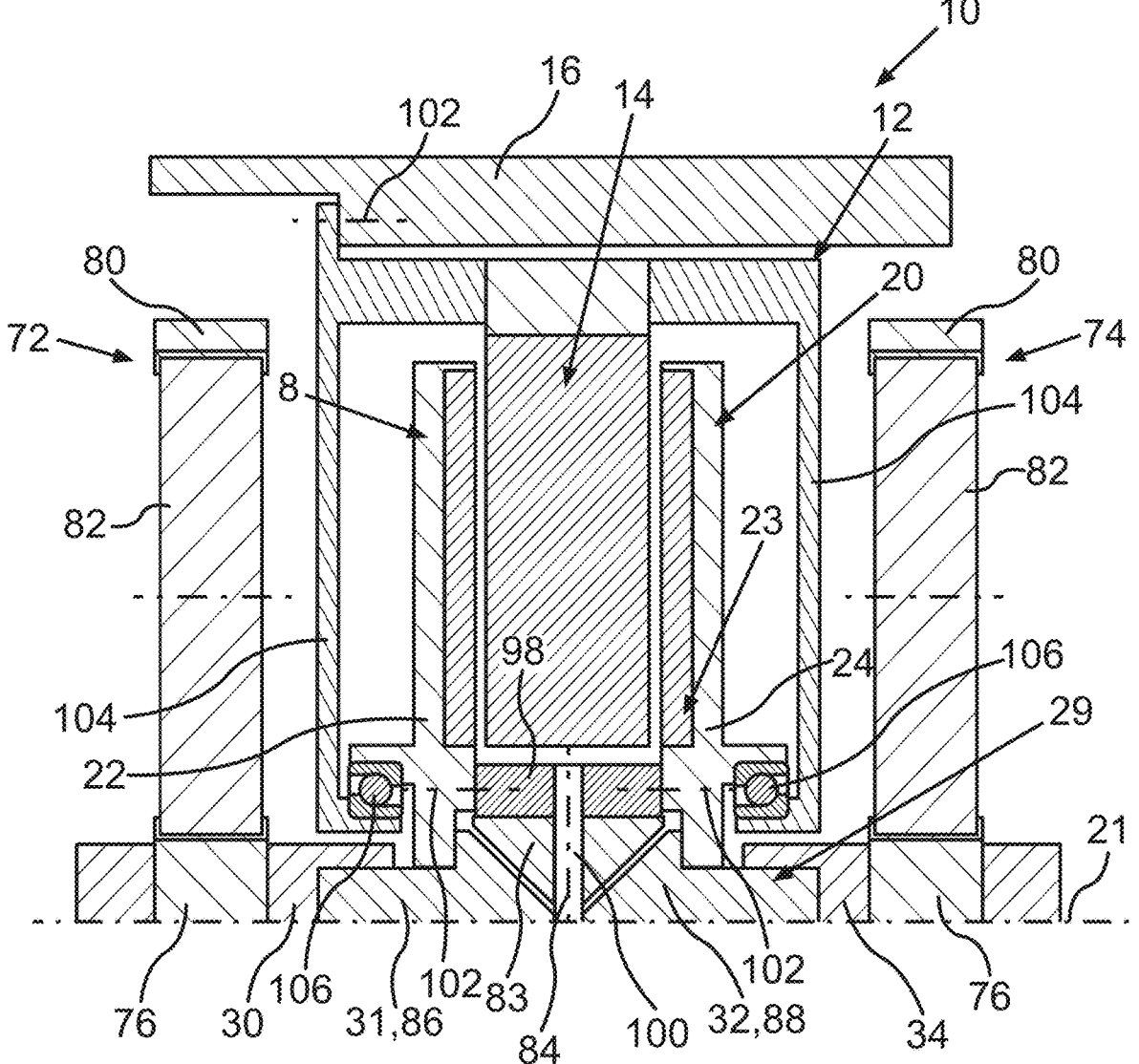
Figure 8:
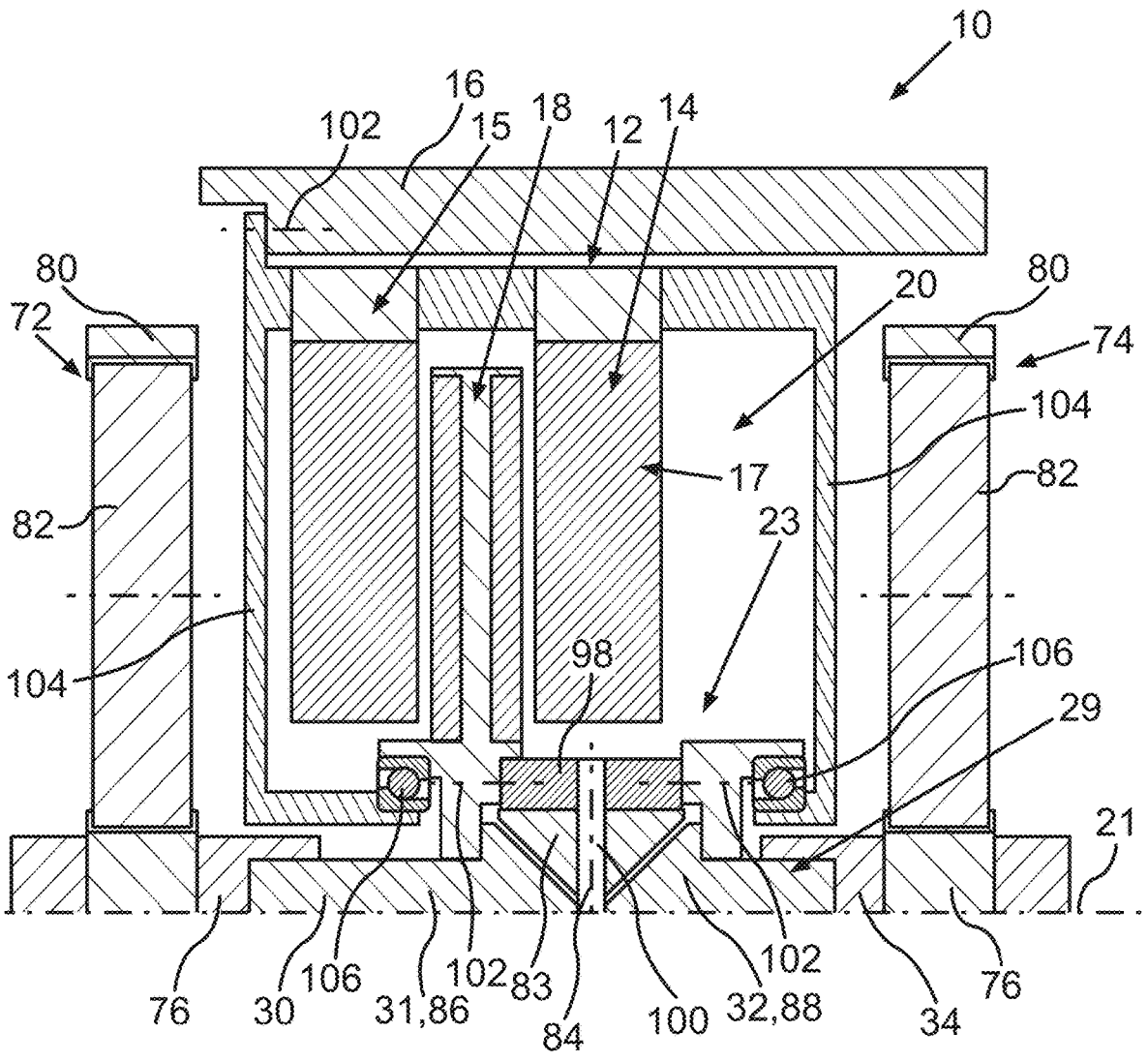

FIG. 1, in sections, a schematic longitudinal sectional view of a first embodiment of a drive device for a motor vehicle;

FIG. 2 a schematic depiction of a second embodiment of the drive device;

FIG. 3 a schematic depiction of a third embodiment of the drive device;

FIG. 4, in sections, a schematic longitudinal sectional view of a fourth embodiment of the drive device;

FIG. 5 a schematic depiction of a fifth embodiment of the drive device;

FIG. 6 a schematic depiction of a sixth embodiment of the drive device;

FIG. 7, in sections, a schematic longitudinal sectional view of a seventh embodiment of the drive device; and FIG. 8, in sections, a schematic longitudinal sectional view of an eight embodiment of the drive device.

In the Figs., the same or functionally identical elements are provided with the same reference numbers.

DETAILED DESCRIPTION

FIG. 1 shows, in sections, a schematic longitudinal sectional view of a first embodiment of a drive device for a motor vehicle, in particular for a car and more particularly for a passenger car. This means that, in its completely manufactured state, the motor vehicle has the drive device 10. The drive device 10 is, in particular, an electric drive device, by means of which the motor vehicle can be electrically driven, in particularly exclusively so. In particular, the motor vehicle has at least one vehicle axle, also referred to as an axle, which has at least or exactly two vehicle wheels, also referred to as wheels. The vehicle wheels are ground contact elements, via which the motor vehicle can be or is supported vertically on a ground in the vertical direction of the vehicle. By means of the drive device 10, the vehicle wheels of the vehicle axle can be driven electrically, in particular exclusively so, whereby the motor vehicle can be driven electrically, in particular exclusively so. For this, the drive device 10 has an electric engine, which is formed as an axial flow engine 12. The axial flow engine 12 is also referred to as disc rotor engine.

The axial flow engine 12 has, in particular, exactly one stator 14, which is connected to a housing 16, depicted schematically, in particular, in FIG. 1, of the drive device 10, in particular fixedly and, quite particularly, non-rotationally. Furthermore, the axial flow engine 12 has, in particular, at least or exactly two rotors 18 and 20, which can be driven by means of the stator 14 and can thus be rotated around an axis of rotation 21 in relation to the stator 14 and in relation to the housing 16. The axial flow engine 12 can provide drive torques via its rotors 18 and 20 for driving the vehicle wheels and thus the motor vehicle. The respective rotor 18, 20 has a respective rotor support 22, 24. Moreover, the respective rotor 18, 20 has magnets 26, 28. It can also be seen that the respective magnet 26, 28 is held on the respective rotor support 22, 24 of the respective rotor 18, 20. In particular, the respective magnet 26, 28 is a permanent magnet. It can be seen in FIG. 1 that the stator 14 is arranged between the rotors 18 and 20 in the axial direction of the axial flow engine 12, wherein the axial direction of the axial flow engine 12 coincides with the axis of rotation 21. For example, the respective rotor 18, 20 is at least substantially disc-shaped, such that the respective rotor 18, 20 is also referred to as a disc rotor.

In order to now be able to implement a particularly advantageous drive of the motor vehicle in a manner that is favorable in terms of construction space and weight, in particular, the drive device 10 has a differential transmission 29 arranged at least partially radially inside the stator 14, the differential transmission 29 also being referred to simply as a differential. In the first embodiment of the drive device 10 shown in FIG. 1, the differential transmission 29 is formed as a planetary differential, which is also referred to as planetary differential transmission, planetary gear differential, planetary gear differential transmission, spur gear differential, or spur gear differential transmission. In the first embodiment, the planetary differential has a first driven gear 31 in the form of a first spur gear, which is formed in the first embodiment as a first sun gear 31 and is connected non-rotationally to a first driven shaft 30. The planetary differential has a second driven gear 32 in the form of a second spur gear, which in the first embodiment is formed as a second sun gear and is non-rotationally connected to a second driven shaft 34. It can be seen that the driven shafts 30 and 34 are arranged coaxially to one another and can be rotated around the axis of rotation 21 in relation to the housing 16. Moreover, the driven shafts 30 and 34, which are also referred to as lateral shafts or formed as lateral shafts, can be rotated around the axis of rotation 21 in relation to one another. In particular, a first of the vehicle wheels can be driven via the driven shaft 30 and the second vehicle wheel via the driven shaft 34 by the axial flow engine 12.

As is explained in yet more detail below, the rotor supports 22 and 24 of the rotors 18 and 20 are connected to one another in a form-fit manner and thus non-rotationally, wherein the rotor supports 22 and 24 form a differential housing 23 when seen at least in the axial direction of the electric engine and thus and thus along the axis of rotation 21, in which differential housing the differential transmission 29 is at last partially arranged, in particular in such a way that the differential transmission 29 overlaps with and is thus covered at least partially outwardly in the radial direction of the electric engine by the differential housing 23 and thus by the rotor supports 22 and 24.

The planetary differential has at least two planetary bolts 36 and 38, the respective longitudinal extension direction of which runs in parallel to the axial direction of the axial flow engine 12 and thus the drive device 10 overall. The planetary bolts 36 and 38 are arranged one after the other, i.e., one behind the other, in the peripheral direction of the axial flow engine 12 and thus the drive device 10 running around the axial direction of the axial flow engine 12 and thus around the axis of rotation 21 and thus the drive device 10 overall. Moreover, the planetary bolts 36 and 38, which are also simply referred to as bolts, are held on the rotor supports 22 and 24 and thus on the rotors 18 and 20, in particular in such a way that the bolts are connected non-rotationally to the rotor supports 22 and 24 and thus non-rotationally to the rotors 18 and 20. Thus, the rotors 18 and 20, i.e. the rotor supports 22 and 24, are connected to one another in a form-fit manner via the planetary bolts 36 and 38. In particular, the rotor supports 22 and 24 and thus the rotors 18 and 20 are non-rotationally connected to one another in a form-fit manner via the planetary bolts 36 and 38. It can be seen from FIG. 1 that at least one longitudinal region of the differential transmission 29 running in the axial direction of the axial flow engine 12 is overlapped and thus covered by the stator 14 outwardly in the peripheral direction of the axial flow engine 12 running around the axis of rotation 21 completely peripherally in the radial direction. This is explained in more detail below.

The planetary differential has a third spur gear rotatably held on the first planetary bolt 36 in the form of a first planetary gear 40, which meshes with the driven gear 31, yet not with the driven gear 32. Furthermore, the planetary differential has a fourth spur gear rotatably held on the planetary bolt 38 in the form of a second planetary gear 42, which meshes with planetary gear 40 and with the driven gear 32, yet not with the driven gear 31. As an example of the planetary gear 40, it can be seen that the respective planetary gear 40, 42, for example, is mounted rotatably on the respective planetary bolt 36, 38 via a respective bearing 44 formed, in particular, as a roller bearing. The respective planetary gear 40, 42 can be rotated around a respective axis of rotation 46, 48 in relation to the respective planetary bolt 36, 38, wherein the respective axis of rotation 46, 48 runs in parallel to the axis of rotation 21 and is spaced apart from the axis of rotation 21. It can be seen that the driven gears 31 and 32, the planetary gears 40 and 42, the planetary bolts 36 and 38, and also the driven shafts 30 and 34 are each overlapped and thus covered at least partially outwardly by the stator 14 in the radial direction of the axial flow engine 12, whereby a construction that is particularly compact and favorable in terms of construction space can be depicted. Moreover, the rotor supports 22 and 24 function as housing parts of the differential housing, in which the driven gears 31 and 32 and the planetary gears 40 and 42 are each at least partially, in particular completely, arranged.

In FIG. 1, a sealing ring is labelled with 50 and a respective oil passage bore, which oil can flow through, is labelled with 52 or 54. Thus, the differential transmission 29 can be supplied with oil and can thus be cooled and/or lubricated.

The example of the rotor support 22 shows that the rotor support 22 and thus the rotor 18 can be rotatably mounted on the housing 16 via a bearing 56 formed, for example, as a roller bearing. The example of the rotor support 24 shows that the rotor support 24 and thus the rotor 20 can be rotatably mounted on the driven shaft 34 via a bearing 58 formed, for example, as a roller bearing. Furthermore, an optionally provided sealing ring is labelled with 60. It can be seen that the planetary bolts 36 and 38 position the two rotor supports 22 and 24 in relation to each other. The respective rotor support 22, 24 is optionally designed as a simple reshaping part. Forces from the respective rotor support 22, 24 flow on the corresponding side into a respective planet support, also referred to as a web, whereby unfavorable force redirection can be avoided.

FIG. 2 shows a second embodiment of the drive device 10. The second embodiment corresponds in principle to the first embodiment. In the second embodiment, an axially parallel arrangement is provided. For this, the driven shafts 30 and 34, for example, are non-rotationally connected to respective spur gears 62 and 64, which mesh with corresponding further spur gears 66 and 68. As is illustrated by arrows 70, the vehicle wheels, for example, are driven via the spur gears 66 and 68, such that the vehicle wheels or their wheel axes of rotation are de-axled and thus arranged axially parallel to the driven shafts 30 and 34. The spur gears 62, 64, 66 and 68 here provide an advantageous translation, in particular final translation, which is also referred to as final drive.

FIG. 3 shows a third embodiment of the drive device 10. The third embodiment corresponds in principle to the first embodiment, wherein, in contrast to the second embodiment, in the third embodiment a coaxial arrangement of the vehicle wheels or their wheel axes of rotation, in particular in relation to the driven shafts 30 and 34, is provided. Here, a respective final translation, for example, is formed by a respective further planetary gearset 72, 74. The respective planetary gearset 72, 74 has a sun gear 76 connected non-rotationally, for example, to the respective driven shaft 30, 34, a respective planetary support 78 and a respective gear ring 80. The respective gear ring 80 is connected non-rotationally, for example, to the housing 16. The respective sun gear 76 is non-rotationally connected to the respective driven shaft 30, 34. Furthermore, the respective planetary gearset 72, 74 has further planetary gears 82, which are rotatably mounted on the respective planetary support 78. Here, the vehicle wheels can be driven via the planetary supports 78, as is illustrated by the arrows 70. In doing so, a coaxial arrangement of the vehicle wheels or their wheel axes of rotation, in particular in relation to the driven shafts 30 and 34, can be implemented.

FIG. 4 shows a fourth embodiment of the drive device 10. In the fourth embodiment, the differential transmission 29 is formed as a bevel differential, which is also referred to as bevel gear differential or ball differential. Here, at least one of the rotor supports 22 and 24, presently the rotor support 22, forms a differential cage. With the bevel gear differential, the driven gear 31 non-rotationally connected to the driven shaft 30 is a first bevel gear 86. Furthermore, the second driven gear 32 is formed as a second bevel gear 88. The bevel gear differential has a compensation gear 38 formed as a third bevel gear, the compensation gear being rotatably mounted on the differential cage in such a way that the compensation gear 83 can be rotated around a compensation gear axis of rotation 84 in relation to the differential cage and thus in relation to the rotor supports 22 and 24, wherein the compensation gear axis of rotation 84 runs perpendicularly to the axis of rotation 21. Here, the differential cage is, for example, the differential housing or a part of the differential housing.

The bevel gear 86 meshes with the compensation gear 83, and the bevel gear 88 meshes with the compensation gear 83, yet not with the bevel gear 86. The driven gears 31 and 32 and the compensation gear 83 are toothed gears. For example, the rotor supports 22 and 24 are non-rotationally connected to one another, in particular directly, and for this are screwed to one another, for example. An oil passage bore 90 is depicted particularly schematically in FIG. 4, via which oil passage bore the differential transmission 29 arranged radially inside the stator 14 can be provided with oil. A possibly provided sealing ligature is labelled with 92. Moreover, a parking lock gear 94 of a parking lock is optionally provided, wherein the parking lock gear 94 is non-rotationally connected to the rotor supports 22 and 24 and thus non-rotationally to the rotors 18 and 20. The rotor supports 22 are rotatably mounted via the bearings 56 and 58 formed, for example, as roller bearings, in particular on the housing 16. A so-called differential screw connection 96 is also particularly schematically depicted, by means of which the rotor supports 22 and 24 and thus the rotors 18 and 20, for example, are screwed to one another and thus non-rotationally connected to one another.

FIG. 5 shows a fifth embodiment of the drive device 10. The fifth embodiment corresponds in principle to the fourth embodiment, wherein an axially parallel arrangement of the vehicle wheels or their wheel axes of rotation, in particular in relation to the driven shafts 30 and 34, is provided in the fifth embodiment.

FIG. 6 shows a sixth embodiment of the drive device 10. In the sixth embodiment, which corresponds in principle to the fourth embodiment, a coaxial arrangement of the vehicle wheels or their wheel axes of rotation is provided, in particular in relation to the driven shafts 30 and 34. It can be seen that the planetary differential is free of a ring gear with which the planetary gears 40 and 42 mesh. In principle, it would be conceivable that the differential transmission 29 could alternatively be designed as a crown gear differential, which is not depicted in the FIG.

In sections, FIG. 7 shows a schematic depiction of a seventh embodiment of the drive device 10. In the first, second, third, fourth, fifth, sixth and seventh embodiment, the axial flow engine 12 is formed in a so-called H-construction, in which the rotors 18 and 20, also referred to as rotor discs or formed as rotor discs, are spaced apart from one another in the axial direction of the axial flow engine 12 and thus when seen in the axis of rotation 21, and the stator 14 is arranged at least partially between the rotors 18 and 20 (rotor discs) in the axial direction of the axial flow engine 12. Here, the differential transmission 29, also simply referred to as the differential, is arranged particularly compactly inside the axial flow engine 12 and here in particular inside the stator 14, in particular in such a way that the differential transmission 29 is at least partially overlapped and thus covered outwardly in the radial direction of the axial flow engine 12 by the stator 14 and presently also at least partially by the rotors 18 and 20 and here also at least partially by the differential housing 23.

In the seventh embodiment, as in the sixth embodiment, for example, the differential transmission 29 is formed as a bevel gear differential, which is also simply referred to as a bevel differential, bevel differential transmission, or bevel gear differential transmission. In the seventh embodiment, the rotor supports 22 and 24 and thus the rotors 18 and 20 are connected to one another via a web 98 in a form-fit manner and thus non-rotationally. The web 98 is formed separately from the rotor supports 22, 24 and is in each case connected to the rotor supports 22 and 24 in a form-fitting manner and, in particular, non-rotationally. In the seventh embodiment, the differential housing 23 is formed by the rotors 18 and 20 and by the web 98, such that the differential transmission 29 is at least partially overlapped and thus covered outwardly in the radial direction of the axial flow engine 12 by the web 98.

In the seventh embodiment, the compensation gear 83 formed as a bevel gear, is mounted rotatably around the compensation gear axis of rotation in relation to the web 98 and in relation to the rotors 18 and 20 or in relation to the rotor supports 22, 24 in such a way that the compensation gear 83 is rotatably held on the axis 100 around the compensation gear axis of rotation 84 in relation to an axis 100. Here, the axis 100 is held, in particular non-rotationally, on the web 98, in particular in such a way that relative rotations between the axis 100 and the web 98 occurring around the compensation gear axis of rotation 84 are prevented. The axis 100, which is also referred to as the compensation gear axis, is thus integrated into the web 98, so to speak. In particular, the axis 100 is formed separately from the web 98 and is connected to the web 98, i.e., held on the web 98. It can be seen that the seventh embodiment also represents a space-saving and weight-saving integration of the differential transmission 29 into the axial flow engine 12, since already existing components of the axial flow engine 12, in particular the rotor supports 22 and 24, are used or shared for the implementation of the differential housing 23. The sound-emitting rotors 18 and 20 are, for example, encapsulated between bearing covers, particularly when viewed in the axial direction of the axial flow engine 12, for example, and an overall arrangement is, for example, in turn connected to the housing 16 on a flange surface of the housing 16, also referred to as the transmission housing, in particular by means of at least one connecting element 102 shown particularly schematically in FIG. 7.

Respective connecting elements by means of which the web 98 is connected to the rotor supports 22 and 24 are shown particularly schematically in FIG. 7 and are labelled with 102. The respective connecting element 102 can, for example, be formed as a screw or as a pin or as another connecting element. Moreover, the aforementioned bearing covers can be seen in FIG. 7 and are labelled 104. Furthermore, it can be seen from FIG. 7 that the respective rotor support 22, 24 and thus the respective rotor 18, 20 is rotatably mounted on the respective bearing cover 104 via a respective bearing 106, which is presently formed as a rolling bearing. For example, the respective bearing 106 is designed as an angular contact ball bearing, wherein the bearing unit 106 is preferably arranged in an O-arrangement. For example, the connecting element 102 can be formed as a screw, as a pin or as another connecting element.

FIG. 8 shows an eighth embodiment of the electric drive device 10. In the eighth embodiment, the axial flow engine 12 is formed in a so-called I-construction. Here, the stator 14 comprises at least or exactly two stator elements 15 and 17, which are spaced apart from one another in the axial direction of the axial flow engine 12 and thus when seen in the axis of rotation 21. For example, the stator elements 15 and 17 are formed as stator discs or the stator elements 15 and 17 are also referred to as stator discs. Here, the axial flow engine 12 has at least or exactly one rotor 18, which is designed as a rotor disc, for example, or is also referred to as a rotor disc. The rotor 18 is arranged between the stator elements 15 and 17 in the axial direction of the axial flow engine 12, in particular in such a way that the stator element 15 is at least partially overlapped by the rotor 18 in the axial direction of the axial flow engine 12 in relation to the stator element 17 and vice versa. Here, the rotor 18 has the rotor supports 22 and 24, which are connected to each other via the web 98 in a form-fit manner and thus non-rotationally and, in particular together with the web 98, at least partially form the differential housing 23. It can be seen that the rotor supports 22 and 24 and thus the rotor 18 are rotatably mounted on the bearing covers 104 via the bearings 106 formed in particular as radial bearings, and on the housing 16 via these. Here, the stator elements 15 and 17 and thus the stator 14 are non-rotationally fixed to the bearing covers 104 and via these to the housing 16, at least in relation to the axis of rotation 21. FIGS. 7 and 8 thus show the axial flow engine 12 in H-construction or I-construction, wherein the differential transmission 29 is integrated into the axial flow engine 12 to save construction space.

An advantageous noise behavior, which is also referred to as NVH behavior (NVH—noise vibration harshness), can be implemented by an encapsulated arrangement of the axial flow engine 12 inside the two bearing covers 104, in particular with simultaneous, one-sided fastening of the overall arrangement to the housing 16 via a flange surface formed on one of the bearing covers 104. In particular, the differential housing 23 is formed from the web 98 and the rotor supports 22 and 24 or the rotor discs (rotors 18 and 20), in particular in the H-construction, or, in particular in the I-construction, the differential housing 23 is formed from the rotor 18, formed in particular as a rotor disc, the web 98 and at least one of the bearing caps 104. A receiver for the axis 100 is located in the web 98, for example formed as a receiving bore, and at least one or more running surfaces for the compensation wheel 83 is or are integrated in the web 98, for example. This arrangement allows the bevel gears to be accommodated in a space-saving manner. The two rotor discs with the running surfaces for the bevel gears complete the bevel gear arrangement. In the I-construction, which is also referred to as the I-arrangement, analogously a rotor disc and a cover. The components are connected to one another by suitable connecting elements.

The web 98 can also be designed in one piece with the rotor, in particular only screwed on one side. The screw connection can also be made on one side, in particular when the screw completely penetrates the web, and the thread is contained in the other rotor disc. The respective driven gear 31, 32 is fixedly connected to the respective driven shaft 30, 34, also referred to as the axis shaft. Thus, the gearset can be designed to be particularly compact, since the driven gear 31, 32, formed as an axis bevel gear, for example, does not have to have any additional splines in the axial basin installation space. The shaft-to-cable connection is thus axially moved outwards into the less space-critical region. The axial running surface in the rotor disc for the bevel gear can thus be designed to be particularly large. In particular with the H-construction, which is referred to as an H-arrangement, the rotor discs or, in the case of an I-arrangement, the rotor disc and the cover, can accommodate the bearings 106. The differential and/or the web 98 can also be partially indented below the rotor. The rotor discs can be encapsulated inside the bearing caps 104 and are thus additionally shielded as a sound source (primarily airborne sound), whereby the overall arrangement is fixed to the housing 16 via the flange surface formed on the bearing cap.

LIST OF REFERENCE NUMBERS

10 Drive device
12 Axial flow engine
14 Stator
15 Stator element
16 Housing
17 Stator element
18 Rotor
20 Rotor
21 Axis of rotation
22 Rotor support
23 Differential housing
24 Rotor support
26 Magnet
28 Magnet
29 Differential transmission
30 Driven shaft
31 Driven gear
32 Driven gear
34 Driven shaft
36 Planetary bolt
38 Planetary bolt
40 Planetary gear 42 Planetary gear
44 Bearing
46 Planetary gear axis of rotation
48 Planetary gear axis of rotation
50 Sealing ring
52 Oil passage bore
54 Oil passage bore
56 Bearing
58 Bearing
60 Sealing ring
62 Spur gear
64 Spur gear
66 Spur gear
68 Spur gear
70 Arrow
72 Planetary gearset
74 Planetary gearset
76 Sun gear
78 Planetary support
80 Ring gear
82 Planetary gear
83 Compensation gear
84 Compensation gear axis of rotation
86 Driven toothed gear
55 Driven toothed gear
90 Oil passage bore
92 Sealing ligature
94 Parking lock gear
96 Differential screw connection
98 Web

The invention claimed is:

1. A drive device for a motor vehicle, the drive device comprising:

an electric engine, which is an axial flow engine comprising a stator and two rotors rotatable in relation to the stator, wherein the stator is arranged between the two rotors in the axial direction of the axial flow engine; and a differential transmission arranged at least partially radially inside the stator and comprising a first driven gear non-rotationally connected to a first driven shaft and a second driven gear non-rotationally connected to a second driven shaft, wherein the two rotors each have a rotor support, wherein the rotor supports of the two rotors are connected to one another in a form-fit manner and form a differential housing when seen at least in an axial direction of the electric engine, and wherein a portion of each of the rotor supports that is directly radially adjacent to the differential transmission are spaced apart from each other, and wherein a space between the portion of each of the rotor supports that is directly radially adjacent to the differential transmission is covered by a sealing ring.

2. A drive device for a motor vehicle, the drive device comprising:

an electric engine, which is an axial flow engine comprising a stator and two rotors rotatable in relation to the stator, wherein the stator is arranged between the two rotors in the axial direction of the axial flow engine; and a differential transmission arranged at least partially radially inside the stator and comprising a first driven gear non-rotationally connected to a first driven shaft and a second driven gear non-rotationally connected to a second driven shaft, wherein the two rotors each have a rotor support, wherein the rotor supports of the two rotors are connected to one another in a form-fit manner and form a differential housing when seen at least in an axial direction of the electric engine, wherein the differential transmission is a planetary differential, the first driven gear is a first sun gear non-rotationally connected to the first driven shaft, the second driven gear is a second sun gear non-rotationally connected to the second driven shaft, the planetary differential has at least two planetary bolts respectively held on the two rotor supports, and via the planetary bolts the two rotor supports are connected to one another in a form-fit manner, the planetary differential has at least one first planetary gear held on a first of the at least two planetary bolts and meshing with the first sun gear, and the planetary differential has at least one second planetary gear rotatably held on a second one of the at least two planetary bolts and meshing with the second sun gear, the second planetary gear meshes with the first planetary gear.

3. A drive device for a motor vehicle, the drive device comprising:

an electric engine, which is an axial flow engine comprising a stator and two rotors rotatable in relation to the stator, wherein the stator is arranged between the two rotors in the axial direction of the axial flow engine; and a differential transmission arranged at least partially radially inside the stator and comprising a first driven gear non-rotationally connected to a first driven shaft and a second driven gear non-rotationally connected to a second driven shaft, wherein the two rotors each have a rotor support, wherein the rotor supports of the two rotors are connected to one another in a form-fit manner and form a differential housing when seen at least in an axial direction of the electric engine, wherein the differential transmission is a bevel gear differential having a compensation gear and arranged in a differential cage, and wherein a portion of one of the two rotor supports forms one side of the differential cage, the compensation gear is rotatably mounted on the portion of the one of the two rotor supports forming the one side of the differential cage, and a sealing ligature is arranged adjacent to the compensation gear and adjacent to the one of the two rotor supports forming the one side of the differential cage, or a portion of both of the two rotor supports forms a part of one side of the differential cage, the portion of both of the two rotor supports forming the part of the one side of the differential cage are spaced apart and connected by a web, and the compensation gear is non-rotatably fixed on the web.

4. The drive device of claim 1, wherein at least one of the two rotors is rotatably mounted on a housing of the drive device via at least one bearing.

5. The drive device of claim 1, wherein at least one of the two rotors is rotatably mounted on one of the first and second driven shafts via at least one bearing.

6. The drive device of claim 2, wherein at least one of the two rotors is rotatably mounted on a housing of the drive device via at least one bearing.

7. The drive device of claim 2, wherein at least one of the two rotors is rotatably mounted on one of the first and second driven shafts via at least one bearing.

8. The drive device of claim 3, wherein the first driven gear is a first bevel gear non-rotationally connected to the first driven shaft, the second driven gear is a second bevel gear non-rotationally connected to the second driven shaft, and the compensation gear is a third bevel gear of the bevel gear differential meshing with the first driven gear and with the second driven gear.

9. The drive device of claim 3, wherein the portion of one of the two rotor supports forming one side of the differential cage is non-rotationally connected to the other one of the two rotor supports via a screw connection.

10. The drive device of claim 3, wherein the portion of both of the two rotor supports forming the part of the one side of the differential cage are connected to each other by a screw or pin.

11. The drive device of claim 3, wherein at least one of the two rotors is rotatably mounted on a housing of the drive device via at least one bearing.

12. The drive device of claim 3, wherein at least one of the two rotors is rotatably mounted on one of the first and second driven shafts via at least one bearing.

* * * * *